Patented Jan. 10, 1950

2,493,763

UNITED STATES PATENT OFFICE 2,493,763

METHOD OF PRODUCING LIGHTWEIGHT AGGREGATE FROM CLAY

Theron A. Klinefelter, Tuscaloosa, Ala.

No Drawing. Application October 1, 1947, Serial No. 777,361

3 Claims. (Cl. 106—41)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to the production of bloated clay masses from clays having poor bloating characteristics. It particularly relates to the production of bloated clays suitable for use as a light weight aggregate in mortars, concrete, and the like Certain clays have been found to form suitable light weight bloated masses when heated to temperatures between about 1800° to 2200° F. However, not all clays can be used to produce a suitable light weight aggregate by mere heat treatment at these temperatures.

It has been found that clays used successfully for bloating purpose are those containing sufficient inherent fluxing agents to produce a glassy phase or pyroplastic condition at temperatures of approximately 2000° F. $\neq$ 200° F. This glassy phase results in a mass impervious to the easy escape of gases forming within the mass because of thermochemical reactions. Because of the plastic condition of the mass the expansion of the gases forms small vesicles thus bloating the whole.

In the process of heat treating of clays from room temperatures to those of about 2000° $\neq$ 200° F. many gases are given off. At 212° F. the bulk of the water present between the particles of clay steams off. Detectable amounts of this mechanically held water continue to come off as high as 500° F. From about 850° F. to 1200° F. chemically combined water from clay is largely given off. Also in this latter stage carbon gases are generated from any lime, magnesia, or dolomite which may be present. Carbon is an almost invariable constituent of these clays and as oxidation takes place more carbon gases are evolved. The major portion of the water and carbon gases however have escaped through the open porous structure of the clay mass by the time 1500° F. to 1800° F. has been reached. At about 1800° F. the iron, lime, magnesia and other fluxing elements present in these types of clays begin forming a glassy phase, and gases have increasingly less chance of escape as the temperature increases since the mass becomes less and less porous and more viscous. From 1800° to 2500° F. and above, the main gases being generated appear to be sulfur gases. These begin forming in appreciable amounts at about 1500° F. but the largest amounts appear to be evolved from 1800° to 2500° F. and above, during the period when the glassy phase has rendered the clay mass quite viscous. The sulfur may derive from certain sulfur compounds generally present to some extent in these clays such as iron, sulphides and calcium and other sulphates.

If these various fluxes and sulphur compounds happen to be present in about the right amounts then bloating occurs at the desired temperatures. However, many of these clays lack the necessary sulphur compounds, and in some cases require heat treatments above the economical commercial ranges, or may be so lacking as not to bloat at all, but fuse down.

Accordingly, it is an object of this invention to provide a method whereby the bloating temperatures of a bloating clay can be lowered. It is another object of this invention to provide a method whereby the volume of bloat in a bloating clay can be increased. It is still another object of this invention to provide a method whereby a bloated clay can be produced from a clay having poor or non-bloating characteristics.

These objects and advantages are accomplished in accordance with this invention of a method for the production of a light weight bloated clay mass which comprises the treatment at elevated temperatures of an intimate admixture of clay and at least one thermally decomposable sulfur containing substance.

Suitable clays for treatment in accordance with this invention include those clays which do not contain sufficient fluxing agents to permit the formation of a viscous pyroplastic glass phase at temperatures greater than those at which the gaseous decomposition products and other volatile components have been driven off, and at the same time do not contain sufficient thermally decomposable substances to form a sufficient gas volume to effect bloating. Generally clays which fuse at temperatures greater than about 2900° F. and clays wherein the iron is present as oxidic iron have been found to have poor bloating characteristics but are suitable for use in accordance with this invention. Such clays as the Tennessee, Kentucky and Illinois clays from the Porter's Creek formation, clay from the Flint River formation in Georgia, shales near Lovie, Alabama, and some alluvial clays near Pleasantville, Louisiana, are a few examples of clays of this type.

Suitable thermally decomposable sulfur containing substances include flowers of sulfur, iron pyrites; metallic sulfates such as calcium, magnesium, sodium, potassium, copper, iron, menganese, barium, and aluminum and the like. Other sulfur containing substances can be employed but it is presently preferred to use iron pyrites or sulfur for economical reasons.

The invention can be carried out by intimately mixing the clay and the selected sulfur containing substance; the latter preferably in a finely divided form in order to assure a greater uniformity of dispersion. The quantity of sulfur or its compounds which are employed will vary with the nature of the clay and the degree of bloating desired; however, from about one-half to ten percent by weight has generally been found sufficient sulfur or sulfur containing substance for the production of a well bloated product from a clay having very poor bloating characteristics.

The clay and sulfur can be mixed by any conventional mixing means which will assure complete and substantially uniform dispersion of the sulfur throughout the clay mass.

The heating treatment can be carried out in any of the well known conventional heating means employed in the art.

The following examples show how the invention may be carried out but the invention is not limited thereto.

*Example 1*

When from three percent flowers of sulfur were added to a Tennessee clay from the Porter's Creek formation which in the natural state did not bloat until temperatures of 2500° F. to 2600° F. were reached, the thus treated clay bloated readily at 2000° to 2200° F. Similar amounts of ground iron pyrites gave parallel results.

*Example 2*

Clay from near Pleasantville, Louisiana, required temperatures above 2600° F. before any signs of bloating occurred. With the addition of three percent of either sulfur or pyrites an excellent bloated mass developed in the range of 2200° to 2300° F.

*Example 3*

Clay from the Midway Group, near De Kalb, Mississippi, showed a fair bloat at about 2200° F. With one to two percent sulfur or pyrites a bloat of about twice the volume and much better structure was produced. Instead of large irregular blebs, the mass was filled with an even distribution of small even sized vesicles.

From the foregoing description and examples it is apparent that a method for the production of bloated clay masses from clays with poor bloating characteristics has been developed, also the bloating temperature of a bloating clay can be lowered, and the volume of bloat of a poor bloating clay can be increased.

While the invention as particularly described employs thermally decomposable sulfur containing substances, it is not limited thereto, other non-reactive substances which decompose to liberate gaseous decomposition products can also be employed.

Since many widely differing embodiments of the invention will occur to one skilled in the art, the invention is not limited to the specific details, illustrated and described, and various changes can be made therein without departing from the spirit and scope thereof.

What is claimed is:

1. In a process for the production of light weight aggregate by the thermal bloating of clay, the steps which comprise mixing the clay with one-half to ten percent of a substance of the group consisting of sulfur and iron pyrites and thermally bloating said blend.

2. In a process for the production of light weight aggregate by the thermal bloating of clay, the steps which comprise mixing the clay with about one-half to ten percent of finely divided sulfur and thermally bloating said blend.

3. In a process for the production of light weight aggregate by the thermal bloating of clay, the steps which comprise mixing the clay with about one-half to ten percent of iron pyrites and thermally bloating said blend.

THERON A. KLINEFELTER.

REFERENCES CITED

The following references are of record in the file of this patent:

UNITED STATES PATENTS

| Number | Name | Date |
|---|---|---|
| 1,556,268 | Walkley | Oct. 6, 1925 |
| 1,856,929 | Peck | May 3, 1932 |

FOREIGN PATENTS

| Number | Country | Date |
|---|---|---|
| 392,465 | Great Britain | 1933 |